United States Patent [19]
Young

[11] 3,772,122
[45] Nov. 13, 1973

[54] PRIMER FOR ADHESION OF SILICONE RUBBER TO METAL

[75] Inventor: Donald G. Young, Glendale, Ky.

[73] Assignee: Dow Corning Corporation, Midland, Mich.

[22] Filed: Dec. 9, 1971

[21] Appl. No.: 206,564

Related U.S. Application Data

[62] Division of Ser. No. 27,112, April 9, 1970, Pat. No. 3,677,998.

[52] U.S. Cl. .................. 156/329, 117/75, 117/79, 156/315, 161/207
[51] Int. Cl. .................. C09j 5/00, B32b 15/08
[58] Field of Search .............. 117/75, 79; 156/308, 156/314, 315, 329; 161/207; 260/33.6 SB

[56] References Cited
UNITED STATES PATENTS

| | | | |
|---|---|---|---|
| 2,736,721 | 2/1956 | Dexter | 260/42 |
| 2,751,314 | 6/1956 | Keil | 117/72 |
| 2,928,798 | 3/1960 | Brown et al. | 260/28 |
| 3,258,382 | 6/1966 | Vincent | 156/329 |
| 3,262,830 | 7/1966 | Vincent | 156/329 |
| 3,360,425 | 12/1967 | Boone | 161/207 |
| 3,377,309 | 4/1968 | Harper | 260/32.8 |
| 3,379,607 | 4/1968 | Foster et al. | 161/207 |
| 3,619,255 | 11/1971 | Lengnick | 117/75 |

*Primary Examiner*—Alfred L. Leavitt
*Assistant Examiner*—Robert A. Dawson
*Attorney*—Robert F. Fleming, Jr. et al.

[57] ABSTRACT

A mixture of an organotitanate, tetra(methoxyethoxy)-silane, a methylsiloxane resin, acetic acid or an organotriacetoxysilane and a hydrocarbon solvent is useful as a primer in adhering a silicone rubber to a metal surface such as titanium.

7 Claims, No Drawings

PRIMER FOR ADHESION OF SILICONE RUBBER TO METAL

This is a division of application, Ser. No. 27,112, filed Apr. 9, 1970, now U.S. Pat. No. 3,677,998.

This invention relates to a primer mixture for metal surfaces to improve the adhesion of a silicone rubber to the metal surface.

The desire to use silicone rubber in the aerospace industry has broadened the need for the silicone rubber to adhere to a wide variety of metals. Conventional silicone rubber does not adhere well to titanium and titanium alloys, especially the room temperature vulcanizable silicone rubbers. A number of methods have been used to adhere the silicone rubber to titanium surfaces including the priming of the titanium surface, however, disadvantages were encountered, such as difficulty in use of primer, too high of cure temperature, and less than desired resulting adhesion.

It is therefore an object of the present invention to provide a primer which improves the adhesion of silicone rubber the metal surfaces, especially a titanium surface.

This invention relates to a mixture consisting essentially of 2.5 to 8 inclusive parts by weight of a tetraorganotitanate in which the organic radical has from two to eight inclusive carbon atoms per organic radical, from 2.5 to 8 inclusive parts by weight of tetra(methoxyethoxy)-silane, from 1.5 to 3.5 inclusive parts by weight of a toluene soluble hydroxylated methylsiloxane resin having an average of from 1.05 to 1.25 inclusive methyl radicals per silicon atom, from 0.1 to 5 inclusive parts by weight of an acetate compound selected from the group consisting of acetic acid and an organotriacetoxysilane in which the organic group has from one to eight inclusive carbon atoms per organic group and is selected from the group consisting of monovalent hydrocarbon radicals and halogenated monovalent hydrocarbon radicals and from 38.5 to 111.5 inclusive parts by weight of a hydrocarbon solvent.

The tetraorganotitanate can be any titanate in which each organic radical contains from two to eight carbon atoms. Examples of the tetraorganotitanates include tetraethyl-titanate, tetraisopropyltitanate, tetra-n-butyltitanate, tetra-2-ethylhexyltitanate, tetraphenyltitanate, tetra-(methoxyethoxy)titanate, diisopropyldiacetoxytitanate, $(CH_3COOCH_2O)_4Ti$ and bis(acetylacetonate)diisopropyltitanate.

The hydroxylated methylsiloxane resin can be any toluene soluble methylsiloxane resin which is hydroxylated. The hydroxylated methylsiloxane resin can contain monomethylsiloxane units, dimethylsiloxane units and trimethylsiloxane units as well as $SiO_2$ units so that the ratio of methyl radicals per silicon atom is from 1.05 to 1.25 inclusive, preferably from 1.10 to 1.25 inclusive. Hydroxylated methylsiloxane resins are well known in the art and can be prepared by the hydrolysis of the corresponding methylchlorosilanes, methylalkoxysilanes and the like. One such method for the preparation of methylsiloxane resins can be found in U.S. Pat. No. 3,489,782 issued Jan. 13, 1970, which process is briefly the hydrolysis of chlorosilanes in a homogeneous solvent mixture, such as water and acetone.

The hydrocarbon solvent can be any of the hydrocarbon solvents conventionally used with organosilicon compound. Examples of hydrocarbon solvents include hexane, octane, toluene, benzene, naptha, heptane, cyclohexane, mineral spirits, xylene and various mixed hydrocarbon solvents. Small amounts of other organic solvents can be present in the hydrocarbon solvents without departing from the present invention, such as alcohols such as butanol.

The acetate compound can be acetic acid or an organotriacetoxysilane. The organic group of the organotriacetoxysilane can have from one to eight inclusive carbon atoms and is a monovalent hydrocarbon radical or halogenated monovalent hydrocarbon radical, such as methyl, ethyl, isopropyl, n-propyl, butyl, isobutyl, pentyl, octyl, phenyl, xylyl, tolyl, chloromethyl, 3,3,3-trifluoropropyl, beta(perfluoropentyl)ethyl, bromobenzyl, chlorophenyl and trichloropropyl.

The amount of tetraorganotitanate and tetra(methoxy-ethoxy)silane in the mixture can each vary from 2.5 to 8 inclusive parts by weight. The amount of hydroxylated methylsiloxane resin in the mixture can vary from 1.5 to 3.5 inclusive parts by weight. The amount of acetate compound in the mixture can vary from 0.1 to 5 inclusive parts by weight, preferably from 1 to 4 inclusive parts by weight. The amount of hydrocarbon solvent in the mixture can vary from 38.5 to 111.5 inclusive parts by weight, preferably from 50 to 100 inclusive parts by weight.

The total mixture of this invention is sensitive to water and for this reason it should be prepared and stored under essentially anhydrous conditions. The ingredients are preferably water free so that water is not added to the mixture by way of the ingredients.

The mixture can be prepared by mixing the ingredients in any desired manner, however, it is best to mix the ingredinets in the hydrocarbon solvent and the tetraorganotitanate is preferably added last. It is also preferred to add the hydroxylated methylsiloxane resin to any of the other ingredients in a dilute hydrocarbon solvent solution.

The mixture of this invention is useful as a primer for adhering silicone rubber to metal substrates. This invention, therefore, also relates to a method of bonding silicone rubber to a metal surface comprising applying a mixture consisting essentially of from 2.5 to 8 inclusive parts by weight of a tetraorganotitanate in which the organic radical has from two to eight inclusive carbon atoms per organic radical, from 2.5 to 8 inclusive parts by weight of tetra-(methoxyethoxy)silane, from 1.5 to 3.5 inclusive parts by weight of a toluene soluble hydroxylated methylsiloxane resin having an average of from 1.5 to 1.25 inclusive methyl radicals per silicon atom, from 0.1 to 5 inclusive parts by weight of an acetate compound selected from the group consisting of acetic acid and an organotriacetoxysilane in which the organic group has from one to eight inclusive carbon atoms per organic group and is selected from the group consisting of monovalent hydrocarbon radicals and halogenated monovalent hydrocarbon radicals and from 38.5 to 111.5 inclusive parts by weight of a hydrocarbon solvent, allowing the mixture to dry on the metal surface to form a primed metal surface, applying over the primed metal surface a room temperature vulcanizable silicone rubber, thereafter heating the resulting combination at a temperature of from 100° to 200°C. for at least 10 minutes whereby silicone rubber is adhered to a metal surface.

The primer mixture of the present invention is applied to a metal surface in any manner conventionally used in applying a dilute solution such as spraying, brushing, dipping and the like. After the primer mixture is applied, it is allowed to dry. The drying can be by allowing the treated metal surface to be exposed to ambient air, warm air is allowed to blow over the treated metal surface, the metal is heated to assist the drying or any of other conventional means for removing the solvent and volatiles from a metal surface. Preferably, the treated metal surface is allowed to dry in contact with ambient air, since more than 30 minutes dry time is not required.

After the primer mixture has dried on the metal surface to provide a primed metal surface, a room temperature vulcanizable silicone rubber is applied to the primed metal surface. The means of applying the room temperature vulcanizable silicone rubber is not critical and can be applied in any conventional manner.

The room temperature vulcanizable silicone rubber can be any of the silicone rubber compositions which vulcanize at room temperature and are well known in the art and can be purchased commerically. The adhesion of room temperature vulcanizable silicone rubber to metal surfaces is most improved when the room temperature vulcanizable silicone rubber is a composition which has as the base polymer, a polymethyl-3,3,3-trifluoropropylsiloxane. Of the room temperature vulcanizable silicone rubbers based on polymethyl-3,3,3-trifluoropropylsiloxane, the primer mixture is particularly useful in adhering those room temperature vulcanizable silicone rubbers where the polymethyl-3,3,3-trifluoropropylsiloxane contains vinyl-siloxane units such as methylvinylsiloxane units or dimethylvinylsiloxane units and the like and a siloxane compound containing silicon-bonded hydrogen atoms and a platinum catalyst.

After the room temperature vulcanizable silicone rubber is applied to the metal surface the combination is heated to 100° to 200°C. to cure the silicone rubber. Although the room temperature vulcanizable silicone rubber will cure below 100°C., the adhesion is not obtained with this primer at cure temperatures below 100°C. Further, it is not advisable to cure at temperatures above 200°C., for economical reasons.

The cured combination of metal, primer and silicone rubber provides a metal surface with silicone rubber adhered to the surface which retains a good adhesion over prolonged periods of high temperature and while in contact with jet fuel.

The metal can be any of the metals ordinarily used in construction of airplanes, automobiles, ships, spacecraft and the like. Of particular interest are titanium and titanium alloys, aluminum, copper, steel, stainless steel, and the like.

The following examples are presented for illustrative purposes only and should not be construed as limiting the present invention which is properly delineated in the claims. Parts are parts by weight unless otherwise stated.

EXAMPLE 1

The following mixture was prepared under anhydrous conditions 58.0 parts of a dry light naphtha with an initial boiling point of 113°C.,
26.1 parts of dry toluene,
6.0 parts of tetrabutyltitanate,
6.0 parts of tetra(methoxyethoxy)silane,
2.9 parts of a toluene soluble hydroxylated methylsiloxane resin consisting of 85 mol percent monomethylsiloxane units and 15 mol percent dimethylsiloxane units,
1.0 of glacial acetic acid.

The above primer mixture was brushed on seven titanium panels which has been washed with chlorothene to remove any grease or dirt. The panel was then allowed to dry in ambient air for one hour. After the primer mixture dried the following room temperature vulcanizable silicone rubber was coated over the primed titanium surface in accordance with Interium Federal Specification TT-S-00230 (Comm NBS).

88.72 parts of a dimethylvinylsiloxy endblocked polymethyl-3,3,3-trifluoropropylsiloxane having a viscosity of 15.000 cs. at 25°C.
16.68 parts of a trimethylsiloxy treated reinforcing silica
0.82 part of carbon black
0.82 part of zinc oxide
0.12 part of a chloroplatinic acid catalyst containing 0.1 weight percent platinum,
1.56 parts of

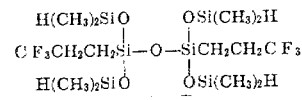

1.30 parts of titanium dioxide. The coated panel was then cured for 30 minutes at 150°C. and then tested in accordance with Interium Federal Specification TT-S-00230 (Comm NBS).

The primer mixture described above was stored for six weeks under anhydrous conditions and then titanium panels were primed, coated with the above room temperature vulcanizable silicone rubber and tested in accordance with Interium Federal Specification TT-S-00230 (Comm NBS).

The adhesion was determined initially and then after defined periods of time under dry heat environment of 232°C. as shown in Table I. The results were recorded for the peel strength as pounds per square inch (p.s.i.) and percent cohesive failure.

TABLE I

| Time at 232°C. days | Initial Primer Mixture Peel Strength, psi | % Cohesive Failure | Stored Primer Mixture Peel Strength, psi | % Cohesive failure |
|---|---|---|---|---|
| Initial | 28 | 100 | 28 | 100 |
| 1 | 16 | 100 | | |
| 3 | 12 | 100 | | |
| 7 | 9 | 100 | 10 | 100 |
| 14 | 8 | 100 | 8 | 100 |
| 21 | 8 | 100 | 8 | 100 |
| 28 | 7 | 100 | 7 | 100 |

The room temperature vulcanized silicone rubber coated on unprimed titanium panels had no adhesion initially.

The above primer mixture and room temperature vulcanizable silicone rubber were used in the procedure as described above except that aluminum panels were used in place of the titanium panels. The results were as shown in Table II.

TABLE II

| Time at 232°C., | Initial Primer Mixture Peel Strength, | % Cohesive | Stored Primer Mixture Peel Strength, | % Cohesive |

| days | psi | Failure | psi | Failure |
|---|---|---|---|---|
| Initial | 23 | 100 | 28 | 100 |
| 1 | 12 | 100 | 12 | 100 |
| 7 | 8 8 | 100 | 8 | 100 |

The above procedure was repeated both for titanium and aluminum, except the adhesion of the resulting combination of metal, primer and silicone rubber was determined after a defined number of fuel cycles. A fuel cycle consists of 2 days immersion in jet fuel liquid at 82°C. followed by 4 days in jet fuel vapor at 232°C. The results were determined and recorded as shown in Table III.

TABLE III

| No. of Cycles | Titanium | | Aluminum | |
|---|---|---|---|---|
| | Peel Strength, psi | % Cohesive Failure | Peel Strength, psi | % Cohesive Failure |
| Initial | 28 | 100 | 23 | 100 |
| 1 | 20 | 100 | 16 | 100 |
| 2 | 16 | 100 | 12 | 100 |
| 3 | 10 | 100 | 10 | 100 |
| 4 | 8 | 100 | 10 | 100 |
| 5 | 8 | 100 | 8 | 100 |
| 6 | 8 | 100 | 7 | 100 |
| 7 | 8 | 100 | | |
| 8 | 8 | 100 | | |
| 9 | 8 | 100 | | |

Equivalent adhesion was obtained when the room temperature vulcanizable silicone rubber was cured at 100°C. for 100 minutes in the above procedure, however, no adhesion was obtained when the above room temperature vulcanizable silicone rubber was cured for seven days at room temperature in the above described procedure.

EXAMPLE 2

The following primer mixtures were prepared and used as described in Example 1. Equivalent adhesion to titanium panels was obtained as shown in Example 1.
A. 10.0 parts of the dry light naphtha as defined in Example 1,
    4.5 parts of dry toluene,
    1.0 part of tetrabutyltitanate,
    1.0 part of tetra(methoxyethoxy)silane,
    0.5 part of the toluene soluble hydroxylated methylsiloxane resin as described in Example 1, and
    0.5 part of $CH_3CH_2CH_2CH_2Si(OOCCH_3)_3$.
B. The same composition as A above except $CH_3CH_2CH_2Si(OOCCH_3)_3$ was used in place of $CH_3CH_2CH_2CH_2Si(OOCCH_3)_3$.
C. The same composition as A above except $CF_3CH_2CH_2Si(OOCH_3)_3$ was used in place of $CH_3CH_2CH_2CH_2Si(OOCCH_3)_3$.

EXAMPLE 3

When any of the following primer compositions are substituted for the primer composition of Example 1, equivalent adhesion to titanium is obtained.
A. 38.5 parts of hexane,
    2.5 parts of tetraisopropyltitanate
    2.9 parts of tetra(methoxyethoxy)silane,
    1.5 parts of a toluene soluble hydroxylated methylsiloxane resin consisting of 75 mol percent monomethylsiloxane units and 25 mol percent of dimethylsiloxane units,
    0.1 part of acetic acid
B. 70 parts of xylene,
    4 parts of tetraethyltitanate
    8 parts of tetra(methoxyethoxy)silane,
    3.5 parts of toluene soluble hydroxylated methylsiloxane resin consisting of 80 mol percent monomethylsiloxane units, 15 mol percent dimethylsiloxane units and 5 mol percent trimethylsiloxane units, and
    5 parts of acetic acid
C. 90 parts of mineral spirits
    21.5 parts of benzene
    8.0 parts of tetra-2-ethylhexyltitanate
    6.5 parts of tetra(methoxyethoxy)silane
    3.0 parts of a toluene soluble hydroxylated methylsiloxane resin consisting of 95 mol percent monomethylsiloxane units and 5 mol percent dimethylsiloxane units, and
    3.0 parts of methyltriacetoxysilane
D. 100 parts of cyclohexane
    3.1 parts of tetraphenyltitanate
    2.5 parts of tetra(methoxyethoxy)silane
    2.5 parts of a toluene soluble hydroxylated methylsiloxane resin consisting of 90 mol percent monomethylsiloxane units and 10 mol percent dimethylsiloxane units, and
    2.5 parts of octyltriacetoxysilane
E. 30 parts of hexane
    20 parts of light naphtha
    10 parts of toluene
    5 parts of bis(acetylacetonate)diisopropyltitanate
    5 parts of tetra(methoxyethoxy)silane
    3 parts of a toluene soluble hydroxylated methylsiloxane resin consisting of 5 mol percent $SiO_2$ units, 70 mol percent monomethylsiloxane units, 20 mol percent dimethylsiloxane units and 5 mol percent trimethylsiloxane units,
    4 parts of phenyltriacetoxysilane That which is claimed is:

1. A method of bonding silicone rubber to a metal surface comprising applying to a metal surface a mixture prepared and stored under essentially anhydrous conditions consisting essentially of from 2.5 to 8 inclusive parts by weight of a tetraorganotitanate in which the organic radical has from two to eight inclusive carbon atoms per organic radical, from 2.5 to 8 inclusive parts by weight of tetra(methoxyethoxy)silane, from 1.5 to 3.5 inclusive parts by weight of a toluene soluble hydroxylated methylsiloxane resin having an average of from 1.05 to 1.25 inclusive methyl radicals per silicon atom, from 0.1 to 5 inclusive parts by weight of an acetate compound selected from the group consisting of acetic acid and an organotriacetoxysilane in which the organic group has from one to eight inclusive carbon atoms per organic group and is selected from the group consisting of monovalent hydrocarbon radicals and halogenated monovalent hydrocarbon radicals and from 38.5 to 111.5 inclusive parts by weight of a hydrocarbon solvent, allowing the mixture to dry on the metal surface to form a primed metal surface, applying over the primer metal surface a room temperature vulcanizable silicone rubber, thereafter heating the resulting combination at a temperature of from 100° to 200°C. for at least 10 minutes whereby silicone rubber is adhered to a metal surface.

2. The method in accordance with claim 1 in which the room temperature vulcanizable silicone rubber has a polymethyl-3,3,3-trifluoropropylsiloxane base polymer.

3. The method in accordance with claim 2 in which the room temperature vulcanizable silicone rubber has a base polymer which contains vinylsiloxane units, a siloxane compound containing silicone-bonded hydrogen atoms and a platinum catalyst.

4. The method in accordance with claim 1 in which the metal surface is a titanium surface.

5. The method in accordance with claim 9 in which the metal surface is a titanium surface.

6. The method in accordance with claim 3 in which the metal surface is a titanium surface.

7. The product prepared by the method of claim 1.

* * * * *

U.S. PATENT OFFICE
UNITED STATES PATENT OFFICE
CERTIFICATE OF CORRECTION

Patent No. 3,772,122          Dated: November 13, 1973

It is certified that errors appear in the above-identified patent and that said Letters Patent are hereby corrected as shown below:

Column 7, claim 5, line 6, "9" should read --2--.

Signed and sealed this 21st day of May 1974.

(SEAL)
Attest:

EDWARD M. FLETCHER, JR.
Attesting Officer

C. MARSHALL DANN
Commissioner of Patents